Patented Aug. 21, 1934

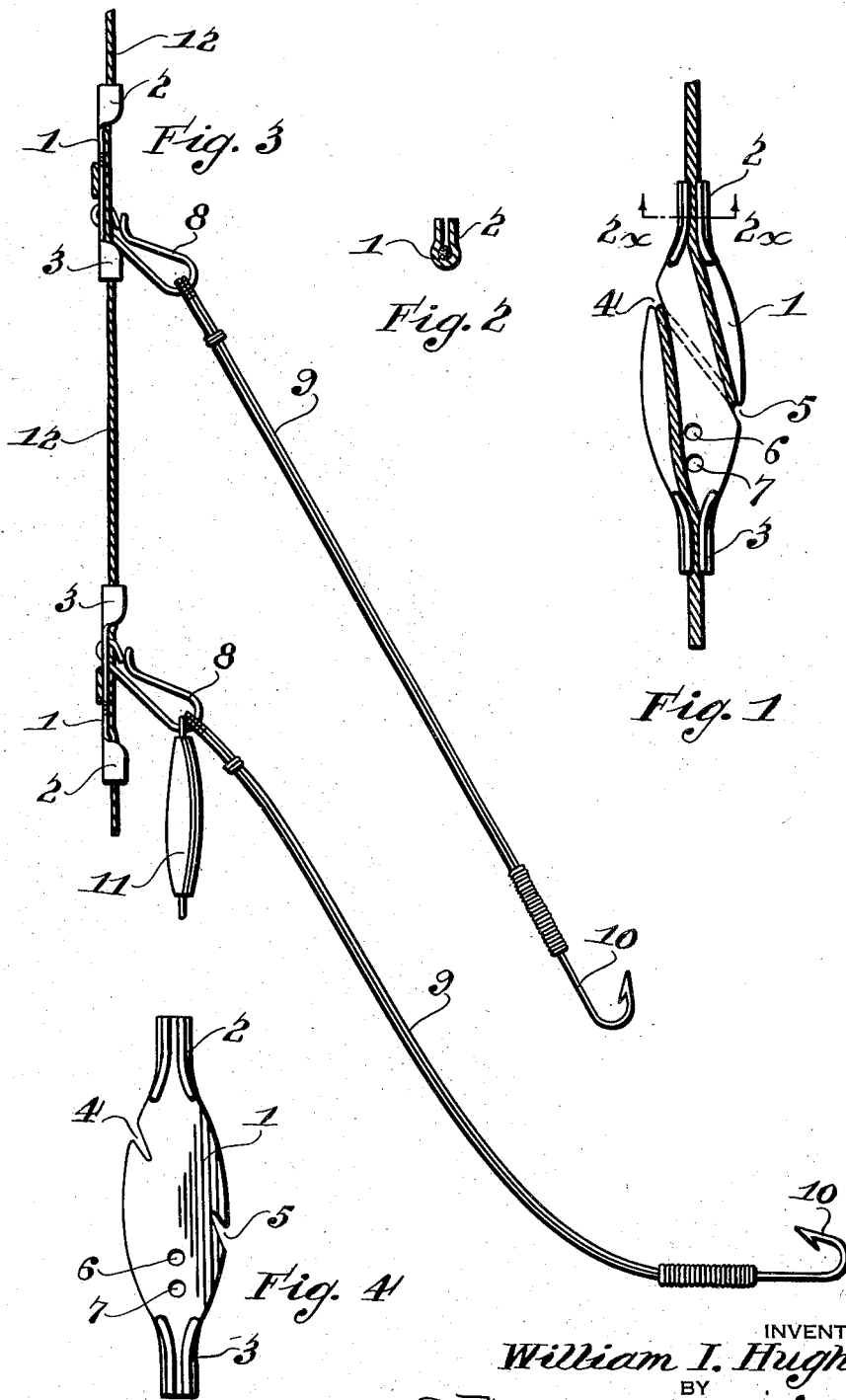

1,970,752

UNITED STATES PATENT OFFICE 1,970,752

CLIP FOR FISH LINES

William I. Hughes, Gates, N. Y.

Application July 22, 1933, Serial No. 681,810

1 Claim. (Cl. 43—28)

The object of this invention is to provide a new and improved device, or attachment, or clip for joining a fishing line and hook together quickly, and which will avoid the necessity of tying the line to the hook and will leave the line and hook quickly detachable from each other.

This and other objects of the invention will be illustrated in the drawing, described in the specification and pointed out in the claim at the end thereof.

In the drawing:

Figure 1 is a front elevation of the attachment with the line attached thereto, the snap hook and fishhook being omitted.

Figure 2 is a section on the line $2x$—$2x$ of Figure 1.

Figure 3 is a side elevation of the fish line with two of the attachments fastened thereto.

Figure 4 is a front elevation of the attachment independent of the line, the snap hook and fishhook being omitted.

In the drawing like reference numerals indicate like parts.

In the drawing reference numeral 1 indicates a metal plate having the groove or guide 2 formed at the top thereof, and a groove or guide 3 formed at the bottom thereof. The sides of the plate are slit diagonally from the edge in to form the wedge-shaped recesses 4 and 5 with which the line can engage. One of these recesses is located below the center of the plate and points upwardly, and the other recess is located above the center of the plate and points downwardly. The line is engaged with the plate by pressing it into the guide 2, and then drawing it down over the front of the plate into the recess 5, and then up over the back of the plate and into the recess 4, and then down over the front of the plate and into the guide 3.

In the plate 1, near one end thereof are punched two holes 6 and 7. In these holes is engaged the upper end of the spring clip or snap hook 8, on which is carried the snell 9 of the fishhook 10, or the lead sinker 11, or both of these devices.

In Figure 3 I have shown two of these plates arranged in tandem on the same line 12, a fishhook being fastened to the upper plate and a fishhook and sinker being fastened to the lower plate.

I claim:

A clip for fastening a fishhook to a line, said clip comprising a metal plate having a guide at the top and a guide at the bottom extending along the axis of the clip and the axis of the line with which the line engages and in which it is held by frictional engagement, said plate having slots cut in the sides thereof extending diagonally toward the central axis, one above the other, said clip being adapted to receive the line in the grooved guide at its upper end and then in the upwardly extending slot, the line being passed diagonally across the back of the plate and then into the downwardly extending slot, and then into the groove guide at the bottom of the clip, said clip having an attachment thereon to which the hook can be fastened.

WILLIAM I. HUGHES.